(12) United States Patent
Agrawal et al.

(10) Patent No.: US 10,907,089 B2
(45) Date of Patent: Feb. 2, 2021

(54) TREATMENT FLUIDS FOR A SUBTERRANEAN FORMATION

(71) Applicant: Baker Hughes Holdings LLC, Houston, TX (US)

(72) Inventors: Devesh Kumar Agrawal, Houston, TX (US); Radhika Suresh, Sugar Land, TX (US); Oleksandr V. Kuznetsov, Manvel, TX (US); Valery N. Khabashesku, Houston, TX (US); John C. Welch, Spring, TX (US)

(73) Assignee: Baker Hughes Holdings LLC, Houston, TX (US)

(*) Notice: Subject to any disclaimer, the term of this patent is extended or adjusted under 35 U.S.C. 154(b) by 49 days.

(21) Appl. No.: 15/905,622

(22) Filed: Feb. 26, 2018

(65) Prior Publication Data
US 2018/0179437 A1   Jun. 28, 2018

Related U.S. Application Data

(62) Division of application No. 15/004,636, filed on Jan. 22, 2016, now Pat. No. 9,902,896.

(51) Int. Cl.
*C09K 8/60* (2006.01)
*E21B 43/16* (2006.01)
*C09K 8/03* (2006.01)

(52) U.S. Cl.
CPC .............. *C09K 8/607* (2013.01); *C09K 8/032* (2013.01); *E21B 43/16* (2013.01); *C09K 2208/10* (2013.01); *C09K 2208/12* (2013.01)

(58) Field of Classification Search
CPC .. C09K 8/607; C09K 2208/10; Y10S 507/901
See application file for complete search history.

(56) References Cited

U.S. PATENT DOCUMENTS

| | | | |
|---|---|---|---|
| 4,280,560 A | 7/1981 | Sydansk | |
| 5,366,834 A * | 11/1994 | Yoneda | C09K 11/025 430/23 |
| 7,528,096 B2 | 5/2009 | Brannon et al. | |
| 2009/0312201 A1 | 12/2009 | Huang et al. | |

(Continued)

OTHER PUBLICATIONS

Abbasi et al., Experimental Inventigation of Clay Mineral's Effects on the Permeability Reduction in Water Injection Process in the Oil Fields, SPE 144248, Society Of Petroleum Engineers, SPE European Formation Damage Conference, Jun. 7-10, 2011, 10 pages.

(Continued)

*Primary Examiner* — Aiqun Li
(74) *Attorney, Agent, or Firm* — TraskBritt (57) ABSTRACT

A method of stabilizing one or more clays within a subterranean formation comprises forming at least one treatment fluid comprising anionic silica particles, cationic silica particles, and at least one base material. The at least one treatment fluid is provided into a subterranean formation containing clay particles to attach at least a portion of the anionic silica particles and the cationic silica particles to surfaces of the clay particles and form stabilized clay particles. A method of treating one or more clays contained within a subterranean formation, and a treatment fluid for a subterranean formation.

12 Claims, 9 Drawing Sheets

(56) References Cited

U.S. PATENT DOCUMENTS

| | | | |
|---|---|---|---|
| 2013/0034653 A1* | 2/2013 | Kumar | B05D 5/06 427/162 |
| 2013/0192835 A1 | 8/2013 | Vorderbruggen et al. | |
| 2013/0206702 A1* | 8/2013 | Lin | C02F 1/5245 210/728 |
| 2014/0096964 A1* | 4/2014 | Chakraborty | B82Y 30/00 166/279 |
| 2017/0210973 A1 | 7/2017 | Agrawal et al. | |

OTHER PUBLICATIONS

Ahmadi et al., Zeta Potential Investigation and Mathematical Modeling of Nanoparticles Deposited on the Rock Surface to Reduce Fine Migration, SPE 142633, Society of Petroleum Engineers, SPE Middle East Oil and Gas Show and Conference, Sep. 25-28, 2011, 14 pages.

Bennion et al., Mechanisms of Formation Damage and Permeability Impairment Associated with the Drilling, Completion and Production of Low API Gravity Oil Reservoirs, SPE 30320, Proceedings of the SPE International Heavy Oil Symposium, Jun. 1995, 13 pages.

Byrne, Michael, Formation Damage—Any Time, Any Place, Any Where, Society of Petroleum Engineers,http://www.spe.org/dl/docs/2010/MichaelByrne.pdf, 2009-2010 Society of Petroleum Engineers Distinguished Lecturer Series, 29 pages.

El-Monier et al, Mitigation of Fines Migration Using a New Clay Stabilizer: A Mechanistic Study, SPE 144180, Societ of Petroleum Engineers, SPE European Formation Damage Conference, Jun. 7-10, 2011, 12 pages.

El-Monier et al, A New Environmentally Friendly Clay Stabilizer, SPE136061, Society of Petroleum Engineers, SPE Production and Operations Conference and Exhibition, Jun. 8-10, 2010, 16 pages.

Fleming et al. Productivity Impairment Due to Kaolinite Mobilization: Laboratory and Field Experience, Oseberg Sor, SPE 107758, Society of Petroleum Engineers, European Formation Damage Conference, May 30-Jun. 1 2007, 13 pages.

Pingo-Almada et al., Experimental Investigation on the Effects of Very Low Salinity on Middle Eastern Sandstone Corefloods, SPE 165180, Societ of Petroleum Engineers, SPE European Formation Damage Conference and Exhibition, Jun. 5-7, 2013, 12 pages.

\* cited by examiner

FIG. 5B

TREATMENT FLUIDS FOR A SUBTERRANEAN FORMATION

CROSS-REFERENCE TO RELATED APPLICATION

This application is a divisional of U.S. patent application Ser. No. 15/004,636, filed Jan. 22, 2016, now U.S. Pat. No. 9,202,896, issued Feb. 27, 2018, the disclosure of which is hereby incorporated herein in its entirety by this reference.

TECHNICAL FIELD

Embodiments of the disclosure relate generally to methods of stabilizing clays within a subterranean formation, and to related clay stabilization fluids. More particularly, embodiments of the disclosure relate to methods of stabilizing clays within a subterranean formation using at least one treatment fluid including anionic silica particles and cationic silica particles, and to related treatment fluids.

BACKGROUND

Movement of aqueous fluid (e.g., water) within a subterranean formation containing one or more clays (e.g., kaolinite, smectite, illite, chlorite, etc.) often results in reduced permeability (also referred to as "formation damage") that is adverse to hydrocarbon material (e.g., oil, natural gas, etc.) extraction processes. Such movement can, for example, occur as a result of the introduction of one or more aqueous fluids (e.g., aqueous flooding fluids, other aqueous treatment fluids, etc.) during downhole operations (e.g., drilling operations, acidizing operations, completion operations, flooding operations, hydraulic fracturing operations, squeeze treatment operations, etc.). Particles of various clay minerals (e.g., kaolinite, illite, etc.) may detach from the subterranean formation during the movement of the aqueous fluid and may migrate to and become detained in pore throats of the subterranean formation to impede fluid flow therethrough. Such clay detachment and fluid flow impairment can be exacerbated by higher pH (e.g., lower salinity) aqueous fluids, making switches from lower (e.g., higher salinity) pH fluids to higher pH fluids problematic during downhole operations. Moreover, various other clay minerals (e.g., montmorillonite) may become swelled by the aqueous fluid and hinder fluid flow through adjacent pores. Frequently, movement of aqueous fluid within a subterranean formation containing clay minerals results in both clay-migration-based permeability losses and clay-swelling-based permeability losses.

Various conventional clay stabilizers have been used to mitigate subterranean formation permeability losses due to clay migration and/or clay swelling by controlling the charge and electrolytic properties of treatment fluids. Examples of such conventional clay stabilizers include potassium chloride (KCl), sodium chloride (NaCl), zirconium oxychloride ($ZrOCl_2$), sodium hydroxide (NaOH), calcium hydroxide (CaOH), hydroxylated aluminum (Al$(OH)_3$), aluminum salts, zirconium salts, quaternary ammonium salts, and cationic organic polymers. Unfortunately, many such conventional clay stabilizers can be inadequate for prolonged clay stabilization (e.g., being readily removed by acids), can be too large for smaller pores (e.g., contributing to reduced permeability through such pores), can be difficult to handle and/or dispose of, can be environmentally toxic, and/or can be too expensive for practical usage on a commercial scale.

It would, therefore, be desirable to have new methods and treatment fluids for stabilizing clay contained within subterranean formations.

BRIEF SUMMARY

Embodiments described herein include methods of stabilizing clays within a subterranean formation, as well as related clay stabilization fluids. For example, in accordance with one embodiment described herein, a method of stabilizing one or more clays within a subterranean formation comprises forming at least one treatment fluid comprising anionic silica particles, cationic silica particles, and at least one base material. The at least one treatment fluid is provided into a subterranean formation containing clay particles to attach at least some of the anionic silica particles and the cationic silica particles to surfaces of the clay particles and form stabilized clay particles.

In additional embodiments, a method of treating one or more clays contained within a subterranean formation comprises forming a first treatment fluid comprising anionic silica particles and a first base material, and forming a second treatment fluid comprising cationic silica particles and a second base material. The first treatment fluid and the second treatment fluid are injected into a subterranean formation to interact with and substantially stabilize at least a portion of clay particles within the subterranean formation.

In further embodiments, a treatment fluid for a subterranean formation comprises a base material, anionic silica particles dispersed within the base material, and cationic silica particles dispersed within the base material.

DETAILED DESCRIPTION

Methods of stabilizing clays within a subterranean formation are described, as are related treatment fluids. In some embodiments, a method of stabilizing clays within a subterranean formation includes forming at least one treatment fluid comprising anionic silica particles, cationic silica particles, and at least one base material. The anionic silica particles and the cationic silica particles may be structured and formulated to attach (e.g., adsorb) to charged surfaces (e.g., negatively-charged major faces, positively-charged edges, etc.) of clay particles within a subterranean formation to stabilize the clay particles. The at least one treatment fluid may be injected into and infiltrate one or more regions of the subterranean formation to interact with the clay particles contained therein and mitigate permeability losses within the one or more regions of the subterranean formation. The methods and treatment fluids of the disclosure may reduce costs and increase the simplicity, efficiency, and duration of clay stabilization within a subterranean formation as compared to conventional clay stabilization methods and conventional treatment fluids. The methods and treatment fluids of the disclosure may reduce permeability losses in and facilitate enhanced hydrocarbon extraction from clays-containing hydrocarbon-bearing subterranean formations.

The following description provides specific details, such as material types, stream compositions, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional techniques employed in the industry. In addition, the description provided below does not form a complete process flow for stabilizing clay within a subterranean formation. Only those process acts and structures necessary to understand the embodiments of the disclosure are described in detail below. A person of ordinary skill in the art will understand that some process components (e.g., pipelines, line filters, valves, temperature detectors, flow detectors, pressure detectors, and the like) are inherently disclosed herein and that adding various conventional process components and acts would be in accord with the disclosure. Also note, any drawings accompanying the application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

As used herein, the singular forms "a," "an," and "the" are intended to include the plural forms as well, unless the context clearly indicates otherwise.

As used herein, the term "and/or" includes any and all combinations of one or more of the associated listed items.

As used herein, relational terms, such as "first," "second," "top," "bottom," "upper," "lower," "over," "under," etc., are used for clarity and convenience in understanding the disclosure and accompanying drawings and do not connote or depend on any specific preference, orientation, or order, except where the context clearly indicates otherwise.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

Figure 1:
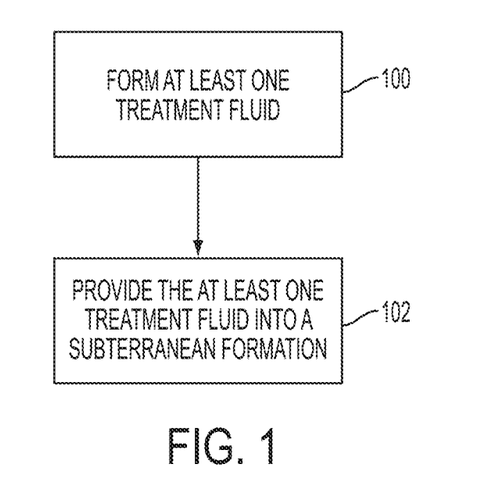
FIG. 1 is a simplified flow diagram depicting a method of stabilizing clay within a subterranean formation, in accordance with embodiments of the disclosure.

FIG. 1 is a simplified flow diagram illustrating a method of stabilizing one or more clays within a subterranean formation, in accordance with embodiments of the disclosure. The method includes a treatment fluid formation act 100 including forming at least one treatment fluid including anionic silica particles and cationic silica particles, and an injection act 102 including providing the at least one treatment fluid into a subterranean formation to stabilize clays within the subterranean formation. As used herein, "clay" refers to a hydrated or anhydrous silicate mineral exhibiting a layered structure. Non-limiting examples of clays include alumino-silicate clays, such as kaolins (e.g., hallyosite, kaolinite, dickite, nacrite), smectites (e.g., montmorillonite, nontronite), illites, and chlorites (e.g., clinochlore, chamosite, nimite, pennantite). With the description as provided below, it will be readily apparent to one of ordinary skill in the art that the method described herein may be used in various applications. In other words, the method may be used whenever it is desired to stabilize one or more clays resident within a subterranean formation.

Referring to FIG. 1, the treatment fluid formation act 100 includes forming one or more treatment fluids that, individually or in combination, include anionic silica particles, cationic silica particles, at least one base material, and, optionally, one or more additional additives. Each of the components of the treatment fluid (or treatment fluids) may be compatible with the other components (e.g., materials, constituents, etc.) of the treatment fluid (or treatment fluids). As used herein, the term "compatible" means that a material does not undesirably react, decompose, or absorb another material, and also that the material does not undesirably impair the chemical and/or mechanical properties of the another material.

The treatment fluid formation act 100 may include forming a single (e.g., only one) treatment fluid, or may include forming multiple (e.g., more than one) treatment fluids. In some embodiments, the treatment fluid formation act 100 includes forming a single treatment fluid. The single treatment fluid may be formed of and include anionic silica particles, cationic silica particles, a base material, and, optionally, one or more additional additives. If the treatment fluid formation act 100 includes forming a single treatment fluid, the single treatment fluid may, by itself, stabilize one or more clays within a subterranean formation, as described in further detail below. In additional embodiments, the treatment fluid formation act 100 includes forming multiple treatment fluids. At least one of the multiple treatment fluids may include at least one component not present in at least one other of the multiple treatment fluids. By way of non-limiting example, a first treatment fluid may be formed of and include anionic silica particles, a first base material, and, optionally, one or more additional additives; and a second treatment fluid may be formed of and include cationic silica particles, a second base material, and, optionally, one or more additional additives. Put another way, the first treatment fluid may include anionic silica particles but not cationic silica particles (i.e., cationic silica particles may be absent from the first treatment fluid), and the second treatment fluid may include cationic silica particles but not anionic silica particles (i.e., anionic silica particles may be absent from the second treatment fluid). Alternatively, each of the multiple treatment fluids may include substantially the same components as each other of the multiple treatment fluids. By way of non-limiting example, each of the multiple treatment fluids may be formed of and include anionic silica particles, cationic silica particles, a base material, and, optionally, one or more additional additives, but at least one of the multiple treatment fluids may exhibit a different amount (e.g., concentration) of one or more of the anionic silica particles, the cationic silica particles, the base material, and the one or more additional additives (if any) than at least one other of the multiple treatment fluids. If the treatment fluid formation act 100 includes forming multiple treatment fluids, the multiple treatment fluids may work in combination with one another to stabilize one or more clays within a subterranean formation, as described in further detail below.

The anionic silica particles and the cationic silica particles of the treatment fluid (or treatment fluids) are structured and formulated to facilitate the formation of stabilized clay particles. As used herein each of the terms "stable clay particle" and "stabilized clay particle" means and includes a clay particle resistant to electrical charge modification during interaction (e.g., contact) with an aqueous material. The anionic silica particles and the cationic silica particles may be structured and formulated to interact with the clay particles to form modified clay particles that do not swell substantially upon contact with an aqueous material, that remain attached to surfaces of a subterranean formation upon contact with an aqueous material, and/or that, if detached from surfaces of the subterranean formation, remain substantially discretely (e.g., separately, individually, etc.) dispersed and suspended (e.g., do not substantially settle, coalesce, flocculate, agglomerate, or precipitate) within an aqueous material. The anionic silica particles and the cationic silica particles may each independently be structured and formulated to attach (e.g., irreversibly attach, adsorb) to surfaces of the clay particles to at least partially (e.g., substantially) neutralize negative charges and positive charges of the clay particles and substantially stabilize the clay particles. The attachment of the anionic silica particles and the cationic silica particles to the clay particles may minimize undesirable interactions between the clay particles and water molecules, and at least partially (e.g., substantially) mitigate one or more of swelling and migration of the clay particles. Stabilized clay particles within a subterranean formation that do migrate during interaction with an aqueous material may remain substantially suspended in the aqueous material and may be readily transported through openings (e.g., pores, pore throats, etc.) in the subterranean formation so as to substantially limit (e.g., prevent) obstruction (e.g., plugging) of the openings.

The anionic silica particles of the treatment fluid(s) may be structured and formulated to attach (e.g., irreversibly attach, adsorb) to exposed, positively-charged surfaces (e.g., edges) of clay particles within a subterranean formation. Attachment (e.g., adsorption) of the anionic silica particles to the exposed, positively-charged surfaces of the clay particles may at least partially (e.g., substantially) neutralize positive charges of the clay particles. The anionic silica particles may be structured and formulated to at least partially (e.g., substantially) cover the exposed, positively-charged surfaces of the clay particles.

The anionic silica particles of the treatment fluid(s) may comprise silica particles exhibiting one or more negatively-charged surfaces. The negatively-charged surfaces of the anionic silica particles may exhibit one or more anionic functional groups. Suitable anionic groups include, but are not limited to, aldehyde groups, epoxy groups, halogen groups, hydroxyl groups, carboxyl groups, nitrile groups, phosphate groups, phosphonate groups, silanol groups, silanediol groups, silanetriol groups, sulfate groups, sulfonate groups, and thiol groups. In some embodiments, the anionic silica particles exhibit at least one of terminal hydroxyl groups and terminal carboxyl groups. The anionic functional groups may be attached to atoms (e.g., silicon atoms, oxygen atoms) of the anionic silica particles directly, and/or through intermediate functional groups by way of one or more conventional reaction mechanisms. Suitable anionic silica particles are commercially available from numerous sources including, but not limited to, Nissan Chemical Industries (Houston, Tex.) under the SNOWTEX® tradename (e.g., SNOWTEX®-XS).

Each of the anionic silica particles may independently exhibit a desired degree (e.g., amount, density, etc.) of anionic functionalization. By way of non-limiting example, each of the anionic silica particles may independently exhibit from about one (1) anionic functional group per five (5) surface atoms (e.g., surface silicon atoms) of the anionic silica particle to about one (1) anionic functional group per one hundred (100) surface atoms of the anionic silica particle. Each of the anionic silica particles may exhibit substantially the same type of anionic functionalization (e.g., each of the anionic silica particles may exhibit substantially the same anionic functional groups), or the anionic functionalization of at least one of the anionic silica particles may be different than the anionic functionalization of at least one other of the anionic silica particles (e.g., at least one of the anionic silica particles may exhibit one or more different anionic functional groups that at least one other of the anionic silica particles). In some embodiments, each of the anionic silica particles has substantially the same anionic functionalization. In additional embodiments, a portion of the anionic silica particles have substantially the same anionic functionalization, and another portion of the anionic silica particles have a different anionic functionalization.

The size and shape of each of the anionic silica particles may be selected based on the characteristics of the subterranean formation. For example, the anionic silica particles may be sized and shaped to fit within interstitial spaces (e.g., pores, capillaries, cracks, fractures, channels, etc.) of the subterranean formation and to attach to and at least partially (e.g., substantially) cover exposed, positively-charged surfaces of clay particles within the subterranean formation. In some embodiments, the anionic silica particles may comprise nanoparticles. As used herein the term "nanoparticle" means and includes a particle having an average particle width or diameter of less than about 1 micrometer ($\mu$m) (i.e., 1000 nanometers). Each of the anionic silica particles may, for example, independently have an average particle width or diameter of less than or equal to about 750 nm, such as less than or equal to about 500 nm, less than or equal to about 250 nm, less than or equal to about 100 nm, less than or equal to about 50 nm, or less than or equal to about 20 nm. In some embodiments, each of the anionic silica particles exhibits an average particle width or diameter within a range of from about 5 nm to about 80 nm. In additional embodiments, one or more of the anionic silica particles may have an average particle width or diameter greater than or equal to about 1 $\mu$m, such as within a range of from about 1 $\mu$m to about 25 $\mu$m, from about 1 $\mu$m to about 20 $\mu$m, or from about 1 $\mu$m to about 10 $\mu$m. Furthermore, each of the anionic silica particles may independently exhibit a desired shape, such as at least one of a spherical shape, a hexahedral shape, an ellipsoidal shape, a cylindrical shape, a tubular shape, a conical shape, or an irregular shape. In some embodiments, each of the anionic silica particles exhibits a substantially spherical shape.

The anionic silica particles may be monodisperse, wherein each of the anionic silica particles has substantially the same size, shape, and anionic functionalization, or may be polydisperse, wherein the anionic silica particles include a range of sizes, shapes, and/or anionic functionalizations. In some embodiments, the anionic silica particles are substantially monodisperse. In additional embodiments, the anionic silica particles are substantially polydisperse.

The amount of the anionic silica particles in the treatment fluid (or treatment fluids) may be tailored to the amount and material composition of clay contained within the subterranean formation. The treatment fluid (or treatment fluids) may include a sufficient amount of the anionic silica particles that, in conjunction with an amount of the cationic silica particles in the treatment fluid (or treatment fluids), facilitate stabilization of the clay within the subterranean formation. By way of non-limiting example, the treatment fluid (or treatment fluids, individually or combined) may include up to about 2.0 weight percent (wt %) anionic silica particles, such as up to about 1.0 wt % anionic silica particles, from about 0.001 wt % anionic silica particles to about 1.0 wt % anionic silica particles, from about 0.01 wt % anionic silica particles to about 1.0 wt % anionic silica particles, from about 0.05 wt % anionic silica particles to about 1.0 wt % anionic silica particles, or from about 0.001 wt % anionic silica particles to about 0.1 wt % anionic silica particles. In some embodiments, the treatment fluid (or treatment fluids, individually or combined) includes from about 0.01 wt % anionic silica particles to about 1.0 wt % anionic silica particles.

The cationic silica particles of the treatment fluid(s) may be structured and formulated to attach (e.g., irreversibly attach) to exposed, negatively-charged surfaces (e.g., major surfaces) of clay particles within the subterranean formation. Attachment (e.g., adsorption) of the cationic silica particles to the exposed, negatively-charged surfaces of the clay particles may at least partially (e.g., substantially) neutralize negative charges of the clay particles. The cationic silica particles may be structured and formulated to at least partially (e.g., substantially) cover the exposed, negatively-charged surfaces of the clay particles.

The cationic silica particles of the treatment fluid (or treatment fluids) may comprise silica particles exhibiting one or more positively-charged surfaces. The positively-charged surfaces of the cationic silica particles may exhibit one or more cationic functional groups. Suitable cationic groups include, but are not limited to, pyridinium groups, ammonium groups, quaternary ammonium groups, imidazolium groups, quaternary phosphonium groups, and tertiary sulfonium groups. In some embodiments, the cationic silica particles exhibit terminal quaternary ammonium groups. The cationic functional groups may be attached to atoms (e.g., silicon atoms, oxygen atoms) of the cationic silica particles directly, and/or through intermediate functional groups by way of one or more conventional reaction mechanisms. Suitable cationic silica particles are commercially available from numerous sources including, but not limited to, Nissan Chemical Industries, Ltd. (Houston, Tex.) under the SNOWTEX® tradename (e.g., SNOWTEX®-AK).

Each of the cationic silica particles may independently exhibit a desired degree (e.g., amount, density, etc.) of cationic functionalization. By way of non-limiting example, each of the cationic silica particles may independently exhibit from about one (1) cationic functional group per five (5) surface atoms (e.g., surface silicon atoms) of the cationic silica particle to about one (1) cationic functional group per one hundred (100) surface atoms of the cationic silica particle. Each of the cationic silica particles may exhibit substantially the same type of cationic functionalization (e.g., each of the cationic silica particles may exhibit substantially the same cationic functional groups), or the cationic functionalization of at least one of the cationic silica particles may be different than the cationic functionalization of at least one other of the cationic silica particles (e.g., at least one of the cationic silica particles may exhibit one or more different cationic functional groups than at least one other of the cationic silica particles). In some embodiments, each of the cationic silica particles has substantially the same cationic functionalization. In additional embodiments, a portion of the cationic silica particles have substantially the same cationic functionalization, and another portion of the cationic silica particles have a different cationic functionalization.

The size and shape of each of the cationic silica particles may be selected based on the characteristics of the subterranean formation. For example, the cationic silica particles may be sized and shaped to fit within interstitial spaces (e.g., pores, capillaries, cracks, fractures, channels, etc.) of the subterranean formation and to attach to and at least partially (e.g., substantially) cover exposed, positively-charged surfaces of clay particles within the subterranean formation. In some embodiments, the cationic silica particles may comprise nanoparticles. Each of the cationic silica particles may, for example, independently have an average particle width or diameter of less than or equal to about 750 nm, such as less than or equal to about 500 nm, less than or equal to about 250 nm, less than or equal to about 100 nm, less than or equal to about 50 nm, or less than or equal to about 20 nm. In some embodiments, each of the cationic silica particles exhibits an average particle width or diameter within a range of from about 20 nm to about 100 nm. In additional embodiments, one or more of the cationic silica particles may have an average particle width or diameter greater than or equal to about 1 µm, such as within a range of from about 1 µm to about 25 µm, from about 1 µm to about 20 µm, or from about 1 µm to about 10 µm. Furthermore, each of the cationic silica particles may independently exhibit a desired shape, such as at least one of a spherical shape, a hexahedral shape, an ellipsoidal shape, a cylindrical shape, a tubular shape, a conical shape, or an irregular shape. In some embodiments, each of the cationic silica particles exhibits a substantially spherical shape.

The cationic silica particles may be monodisperse, wherein each of the cationic silica particles has substantially the same size, shape, and cationic functionalization, or may be polydisperse, wherein the cationic silica particles include a range of sizes, shapes, and/or cationic functionalizations. In some embodiments, the cationic silica particles are substantially monodisperse. In additional embodiments, the cationic silica particles are substantially polydisperse.

The amount of the cationic silica particles in the treatment fluid (or treatment fluids) may be tailored to the amount and material composition of clay contained within the subterranean formation. The treatment fluid (or treatment fluids) may include a sufficient amount of the cationic silica particles that, in conjunction with an amount of the anionic silica particles in the treatment fluid (or treatment fluids), facilitate stabilization of the clay within the subterranean formation. By way of non-limiting example, the treatment fluid (or treatment fluids, individually or combined) may include up to about 2.0 wt % cationic silica particles, such as up to about 1.0 wt % cationic silica particles, from about 0.001 wt % cationic silica particles to about 1.0 wt % cationic silica particles, from about 0.01 wt % cationic silica particles to about 1.0 wt % cationic silica particles, from about 0.05 wt % cationic silica particles to about 1.0 wt % cationic silica particles, or from about 0.001 wt % cationic silica particles to about 0.1 wt % cationic silica particles. In some embodiments, the treatment fluid (or treatment fluids, individually or combined) includes from about 0.01 wt % cationic silica particles to about 1.0 wt % cationic silica particles. The amount of the cationic silica particles in the treatment fluid (or treatment fluids, individually or in combination) may be greater than the amount of the anionic silica particles in the treatment fluid (or treatment fluids, individually or in combination). The greater amount of the cationic silica particles in the treatment fluid (or treatment fluids) relative to the amount of the anionic silica particle in the treatment fluid (or treatment fluids) may account for the relatively greater surface areas of the exposed, negatively-charged surfaces of the clay particles within the subterranean formation as compared to the surface areas of the exposed, positively-charged surfaces of the clay particles.

The base material of the treatment fluid (or treatment fluids) may comprise at least one flowable material (e.g., fluid) that is compatible with the other components (e.g., the anionic silica particles, the cationic silica particles, additional additives (if any), etc.) of the treatment fluid (or treatment fluids). The base material may, for example, comprise one or more of an aqueous liquid material (e.g., water, an aqueous alkaline solution, ocean water, brine, brackish water, mineralized water, produced water, combinations thereof, etc.), and an organic liquid material (e.g., an alcohol, such as methanol, ethanol, propanol, butanol, hexanol, octanol, combinations thereof; etc.). In some embodiments, the base material is an aqueous alkaline solution comprising water and one or more of sodium iodide (NaI), sodium hydroxide (NaOH), potassium hydroxide (KOH), lithium hydroxide (LiOH), sodium carbonate ($Na_2CO_3$), potassium carbonate ($K_2CO_3$), lithium carbonate ($Li_2CO_3$), ammonia ($NH_4$), and methyl amine ($CH_5N$). In embodiments wherein multiple treatment fluids are formed during the treatment fluid formation act 100, the base material of each of the treatment fluids may be substantially the same, or the base material of at least one of the treatment fluids may be different than that of at least one other of the treatment fluids. In some embodiments, the base material of the treatment fluid (or treatment fluids) formed during the treatment fluid formation act 100 is an aqueous 1.0 wt % NaI solution.

The treatment fluid (or treatment fluids) may, optionally, include at least one additional additive. By way of non-limiting example, the additional additive may be one or more of a surfactant, a dispersant, a scale inhibitor, a scale dissolver, a defoamer, a biocide, and a different additive. The type and amount of the additional additive may at least partially depend on the properties of the anionic silica particles, the cationic particles, and the clay within the subterranean formation. In embodiments wherein multiple treatment fluids are formed during the treatment fluid formation act 100, each of the treatment fluids may include substantially the same type and amount of additional additive, or at least one of the treatment fluids may include a different type and/or a different amount of additional additive. In some embodiments, the treatment fluid (or treatment fluids) formed during the treatment fluid formation act 100 are substantially free of additional additives.

The treatment fluid (or treatment fluids) may be substantially homogeneous (e.g., each of the components of the treatment fluid(s) may be uniformly dispersed throughout the treatment fluid(s)), or may be heterogeneous (e.g., at least one of the components of the treatment fluid(s) may be non-uniformly dispersed throughout the treatment fluid(s)). In some embodiments, the treatment fluid (or treatment fluids) formed during the treatment fluid formation act 100 are substantially homogeneous.

A temperature of the treatment fluid (or treatment fluids) may be selected based on the environmental conditions (e.g., materials, porosity, temperature, etc.) of the subterranean formation into which the treatment fluid is to be injected. The treatment fluid may exhibit a temperature sufficient for the treatment fluid (or treatment fluids) to infiltrate (e.g., permeate, flood, etc.) regions of a subterranean formation adjacent an injection well and interact with one or more clays contained therein. For example, the treatment fluid (or treatment fluids) may exhibit a temperature up to a boiling point of the base material(s) of the treatment fluid (or treatment fluids).

With continued reference to FIG. 1, the injection act 102 includes introducing the treatment fluid (or treatment fluids) into a subterranean formation containing one or more clays. It is expressly contemplated by the inventor that methods of the present disclosure may be employed to stabilize subterranean formations containing multiple different types of clays. The treatment fluid (or treatment fluids) may be introduced into the subterranean formation through conventional processes. For example, one or more pressurized streams of the treatment fluid (or treatment fluids) may be pumped (e.g., by way of a wellhead unit) into an injection well extending to a desired depth within the subterranean formation, and may infiltrate (e.g., permeate, diffuse, etc.) into interstitial spaces of the subterranean formation, wherein the treatment fluid (or treatment fluids) may at least partially interact with (e.g., physically contact, react with, etc.) particles of the clay contained therein. Pressure of the treatment fluid (or treatment fluids) may be controlled to maintain a stable dispersion of the various particulate components (e.g., anionic silica particles, cationic silica particles, additional additives (if any), etc.) of the treatment fluid (or treatment fluids) in the base material(s) of the treatment fluid (or treatment fluids) during the injection act 102.

The extent to which the treatment fluid (or treatment fluids) infiltrates into the interstitial spaces of the subterranean formation and interacts with the one or more clays contained in the subterranean formation at least partially depends the properties of the treatment fluid (or treatment fluids) (e.g., material composition, particle sizes, temperature, pressure, etc.), the properties of subterranean formation (e.g., porosity, pore size, material composition, etc.), and the properties of the one or more clays (e.g., type, particle sizes, etc.) contained within the subterranean formation. The selected properties (e.g., functionalities) of the anionic silica particles and the cationic silica particles permit a unit volume of the treatment fluid (or treatment fluids) containing a sufficient amount of the anionic silica particles and the cationic silica particles to substantially stabilize clay particles exposed and/or present within interstitial spaces of the subterranean formation through reactions between the anionic silica particles and positively-charged surfaces (e.g., edges) of the clay particles and reactions between the cationic silica particles and negatively-charged surfaces (e.g., major faces adjacent the edges) of the clay particles. The anionic silica particles may at least partially (e.g., substantially) neutralize positive charges of the clay particles, and the cationic silica particles may at least partially (e.g., substantially) neutralize negative charges of the clay particles. Accordingly, the combination of the anionic silica particles and the cationic silica particles of the injected treatment fluid (or the injected treatment fluids) may at least partially (e.g., substantially) neutralize all of the charges (e.g., the positive charges and the negative charges) of the clay particles with which the injected treatment fluid (or the injected treatment fluids) interacts with within the subterranean formation.

In embodiments wherein the treatment fluid formation act 100 includes forming multiple treatment fluids, the multiple treatment fluids may be combined prior to introduction into the subterranean formation, or may be separately introduced into the subterranean formation. If the multiple treatment fluids are separately introduced into the subterranean formation, the multiple treatment fluids may be introduced into the subterranean formation substantially simultaneously, or may be introduced into the subterranean formation sequentially. If multiple treatment fluids are introduced into the subterranean formation sequentially, the multiple treatment fluids may be introduced into the subterranean formation in any suitable sequence relative to one another, facilitating the substantial stabilization of the clay within at least a portion of the subterranean formation (e.g., within one or more regions of the subterranean formation proximate to the injection well, within one or more regions of the subterranean formation distal from the injection well, combinations thereof, etc.). For example, a first treatment fluid formed of and including (e.g., consisting of) anionic silica particles, a first base material, and, optionally, one or more additional additives, may be injected into the subterranean formation to interact with and at least partially (e.g., substantially) neutralize positive charges of clay particles contained therein; and then a second treatment fluid formed of and including (e.g., consisting of) cationic silica particles, a second base material, and, optionally, one or more additional additives, may be injected into the subterranean formation to interact with and at least partially (e.g., substantially) neutralize negative charges of the clay particles. As another example, a first treatment fluid formed of and including (e.g., consisting of) cationic silica particles, a first base material, and, optionally, one or more additional additives, may be injected into the subterranean formation to interact with and at least partially (e.g., substantially) neutralize negative charges of clay particles contained therein; and then a second treatment fluid formed of and including (e.g., consisting of) anionic silica particles, a second base material, and, optionally, one or more additional additives may be injected into the subterranean formation to interact with and at least partially (e.g., substantially) neutralize positive charges of the clay particles. As a further example, a first treatment fluid formed of and including (e.g., consisting of) a first amount of anionic silica particles, a first amount of cationic silica particles, a first base material, and, optionally, one or more additional additives, may be injected into the subterranean formation to interact with and at least partially neutralize positive charges and negative charges of clay particles contained therein; and then a second treatment fluid formed of and including (e.g., consisting of) a second amount of anionic silica particles, a second amount of cationic particles, a second base material, and, optionally, one or more additional additives may be injected into the subterranean formation to interact with and at least partially (e.g., substantially) neutralize remaining positive charges and remaining negative charges of the clay particles.

The treatment fluid (or treatment fluids) may be introduced into the subterranean formation at a selected flow rate and duration sufficient to substantially stabilize clay particles present and/or exposed within interstitial spaces of one or more regions of the subterranean formation (e.g., within one or more regions of the subterranean formation proximate to the well intersecting the formation through which the treatment fluid or fluids are introduced, within one or more regions of the subterranean formation distal from the well and in communication therewith, combinations thereof, etc.). The amount of treatment fluid (or treatment fluids) used to treat the one or more regions of subterranean formation may, for example, be within a range of from about 0.1 pore volume (PV) to about 50 PV, such as from about 0.1 PV to about 25 PV, from about 0.1 PV to about 10 PV, from about 0.1 PV to about 5 PV, or from about from about 0.1 PV to about 1 PV. In embodiments wherein multiple treatment fluids are separately introduced into the subterranean formation, substantially the same amount of each treatment fluid may be used treat the subterranean formation, or the amount of at least one of the treatment fluids used to treat the subterranean formation may be different than the amount of at least one other of the treatment fluids used to treat the subterranean formation. By way of non-limiting example, an amount of a first injected treatment fluid formed of and including (e.g., consisting of) anionic silica particles, a first base material, and, optionally, one or more additives may be less than an amount of a second injected treatment fluid formed of and including (e.g., consisting of) cationic silica particles, a first base material, and, optionally, one or more additives. In some embodiments, an amount of a first injected treatment fluid formed of and including (e.g., consisting of) anionic silica particles and a first base material is less than or equal to about 3 PV (e.g., is equal to about 3 PV), and an amount of a second injected treatment fluid formed of and including (e.g., consisting of) anionic silica particles and a second base material is greater than the amount of the first injected treatment fluid and is less than or equal to about 5 PV (e.g., is equal to about 5 PV). In additional embodiments, an amount of the treatment fluid (or treatment fluids) injected into one or more regions of the subterranean formation is within a range of from about 0.1 PV to about 10 PV.

The methods and treatment fluids of the disclosure facilitate the efficient stabilization of clay within a subterranean formation. The treatment fluids of the disclosure, including the anionic silica particles and the cationic silica particles thereof, may provide one or more of enhanced clay stabilization, longer duration clay stabilization, reduced costs (e.g., handling and disposal costs), and reduced negative environmental impact as compared to many conventional treatment fluids employed to stabilize clays within a subterranean formation.

The following examples serve to explain embodiments of the disclosure in more detail. These examples are not to be construed as being exhaustive or exclusive as to the scope of the disclosure.

EXAMPLES

Example 1

Substantially similar dispersions of montmorillonite clay particles in deionized water were treated with different amounts of SNOWTEX®-XS anionic silica nanoparticles. A first dispersion was mixed with zero (0) parts per million (PPM) SNOWTEX®-XS anionic silica nanoparticles, a second dispersion was mixed with fifty (50) PPM SNOWTEX®-XS anionic silica nanoparticles, a third dispersion was mixed with one hundred fifty (150) PPM SNOWTEX®-XS anionic silica nanoparticles, and a fourth dispersion was mixed with three hundred fifty (350) PPM SNOWTEX®-XS anionic silica nanoparticles.

Figure 2:
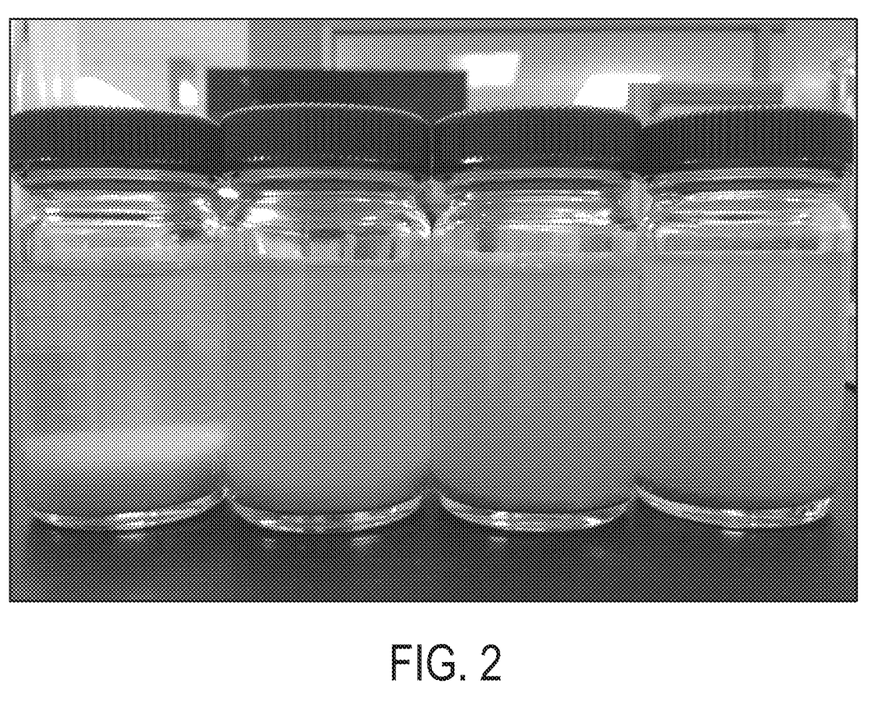
FIG. 2 is a photograph of the results described in Example 1.

FIG. 2 is a photograph showing the results of the different treatments, with the first jar to the (e.g., leftmost jar) containing the first treated dispersion, the second jar to the left containing the second treated dispersion, the third jar to the left containing the third treated dispersion, and the fourth jar to the left (e.g., the rightmost jar) containing the fourth treated dispersion. As shown in FIG. 2, the SNOWTEX®-XS anionic silica nanoparticles were successful at stabilizing each of the second dispersion, the third dispersion, and the fourth dispersion.

Example 2

Dispersions of montmorillonite clay particles in aqueous alkaline solutions having different pH values than one another were treated with different amounts of SNOWTEX®-XS anionic silica nanoparticles. A first dispersion having a pH of about 8.06 was mixed with zero (0) PPM SNOWTEX®-XS anionic silica nanoparticles, a second dispersion having a pH of about 8.5 was mixed with fifty (50) PPM SNOWTEX®-XS anionic silica nanoparticles, a third dispersion having a pH of about 9.0 was mixed with one hundred fifty (150) PPM SNOWTEX®-XS anionic silica nanoparticles, a fourth dispersion having a pH of about 9.5 was mixed with three hundred fifty (350) PPM SNOWTEX®-XS anionic silica nanoparticles, and a fifth dispersion having a pH of about 10 was mixed with one thousand five hundred (1500) PPM SNOWTEX®-XS anionic silica nanoparticles.

Figure 3A:
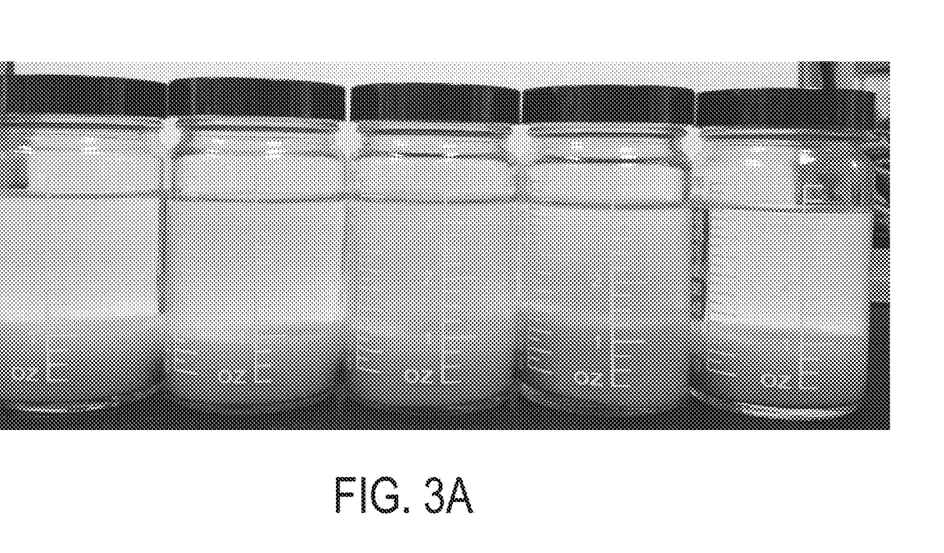
FIGS. 3A through 3D are photographs (FIGS. 3A and 3B) and graphical representations (FIGS. 3C and 3D) of the results described in Example 2.
Figure 3B:
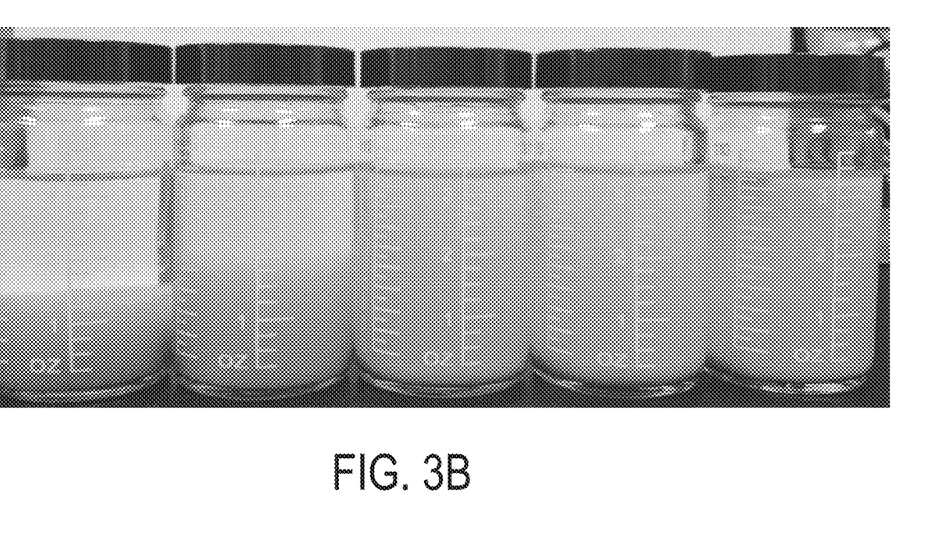

FIG. 3A is a photograph showing the different initial (e.g., untreated) dispersions about four (4) hours after formation and prior to treatment with the different amounts of SNOWTEX®-XS anionic silica nanoparticles, with the first jar to the left (e.g., leftmost jar) containing the first dispersion, the second jar to the left containing the second dispersion, the third jar to the left containing the third dispersion, fourth jar to the left containing the fourth dispersion, and the fifth jar to the left (e.g., the rightmost jar) containing the fifth dispersion. FIG. 3B is a photograph showing the results of the different treatments after about two (2) weeks, with the jars containing the different treated dispersions positioned in accord with the positions of the different initial dispersions described above with respect to FIG. 3A (e.g., first jar to the left containing the first treated dispersion, the second jar to the left containing the second treated dispersion, and so on). As shown in FIG. 3B, each of the SNOWTEX®-XS anionic silica nanoparticle concentrations was successful at at least partially stabilizing the dispersion associated therewith for about two (2) weeks regardless of the pH value of the dispersion, with a majority of the montmorillonite clay particles of dispersions treated with greater than or equal to one hundred fifty (150) PPM SNOWTEX®-XS anionic silica nanoparticles remaining substantially stable for about two (2) weeks regardless of the pH values of the different dispersions.

Figure 3C:
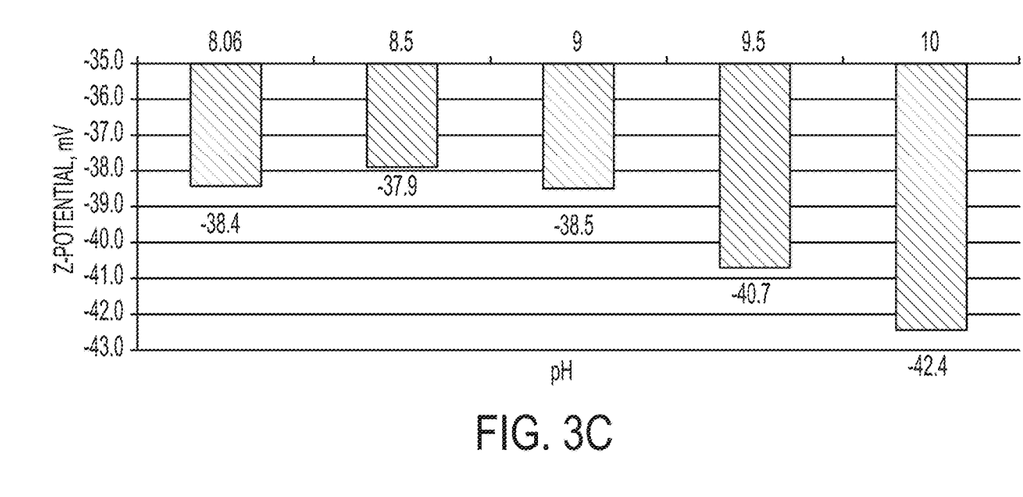
Figure 3D:
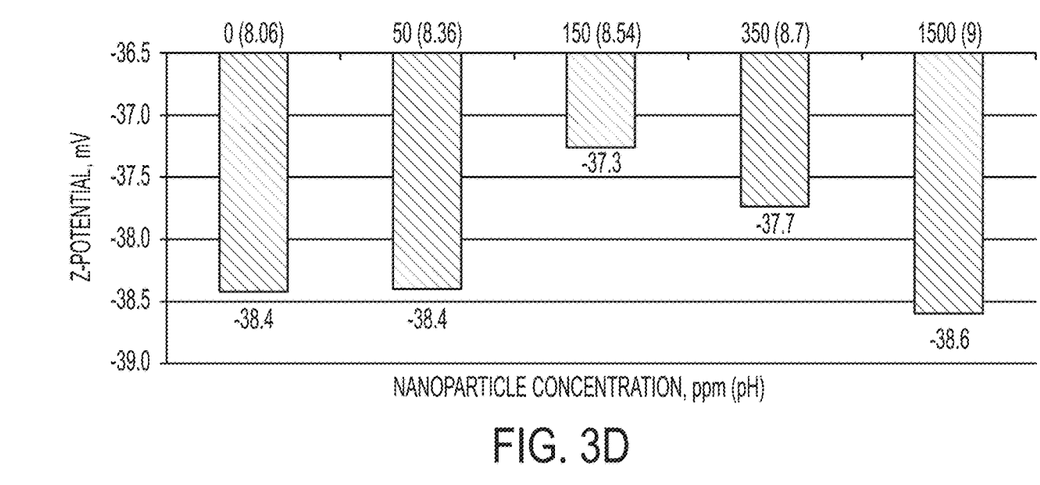

FIG. 3C is a graph depicting the zeta potentials of the different initial dispersions described above. FIG. 3D is a graph depicting the zeta potentials of the different treated dispersions described above. As shown in FIGS. 3C and 3D, the zeta potentials of the different treated dispersions were similar to the zeta potentials of the different initial dispersions even though, as shown in FIGS. 3A and 3B, the montmorillonite clay particles became more stable upon treatment with the SNOWTEX®-XS anionic silica nanoparticles. Accordingly, attachment of the SNOWTEX®-XS anionic silica nanoparticles to positively-charged surfaces (e.g., edges) of the montmorillonite clay particles appears to have increased the stability the montmorillonite clay particles even while the negative charges of the montmorillonite clay particles remained substantially the same (e.g., due to the negatively-charged surfaces of the montmorillonite clay particles that remained substantially unneutralized following treatment with the SNOWTEX®-XS anionic silica nanoparticles).

Example 3

A Berea sandstone core was subjected to core flooding experiments to evaluate permeability reduction (e.g., formation damage) control using cationic silica nanoparticles. The Berea sandstone core had a length of about 4 inches (in), a diameter of about 1.5 in, a weight within a range of from about 240 grams (g) to about 250 g, a pore volume of 19.32 milliliters (ml), a porosity within a range of from about 15 percent to about 20 percent, and an initial permeability within a range of from about 40 millidarcy (md) to about 50 md. The Berea sandstone core was prepared for experimentation by applying an overburden pressure of 1000 pounds per square inch (psi) using PENRECO® draked oil, and vacuuming the Berea sandstone core at room temperature.

Figure 4A:
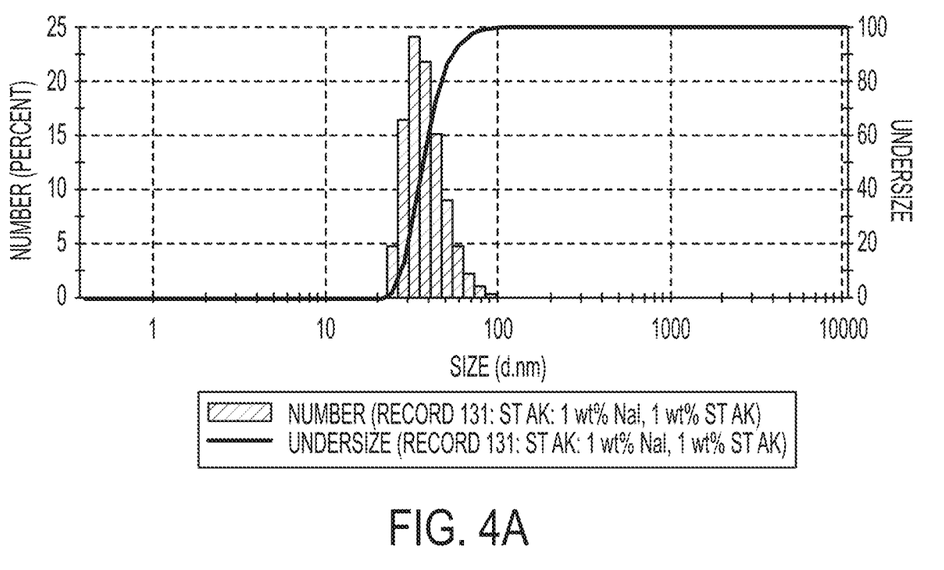
FIGS. 4A through 4E are graphical representations of the results described in Example 3.

Following the preparation of the Berea sandstone core, an aqueous 1 wt % NaI solution, and an aqueous 1 wt % NaI solution including 1 wt % SNOWTEX®-AK cationic silica nanoparticles were each prepared. FIG. 4A is a graph showing the particle size distribution of the SNOWTEX®-AK cationic silica nanoparticles in the aqueous 1 wt % NaI solution including the 1 wt % SNOWTEX®-AK cationic silica nanoparticles.

Figure 4B:
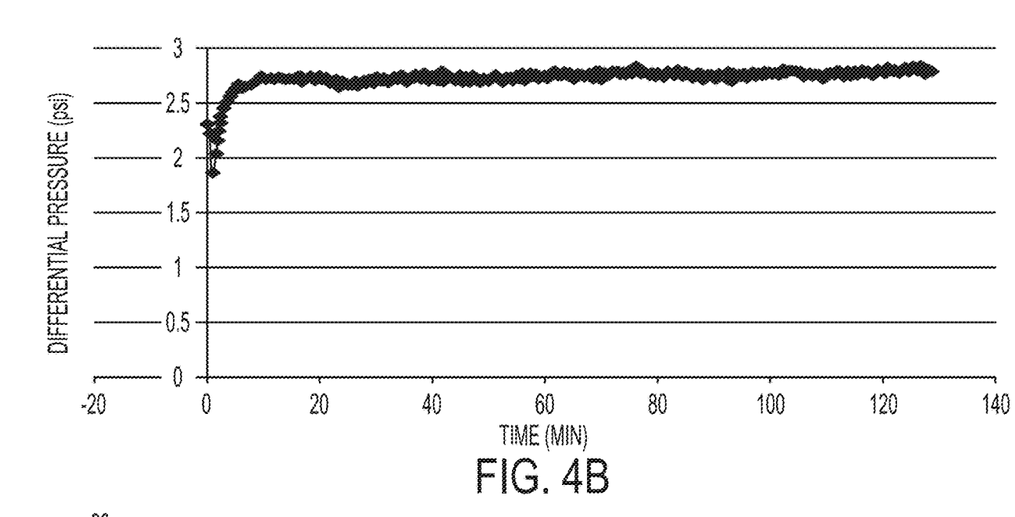
Figure 4C:
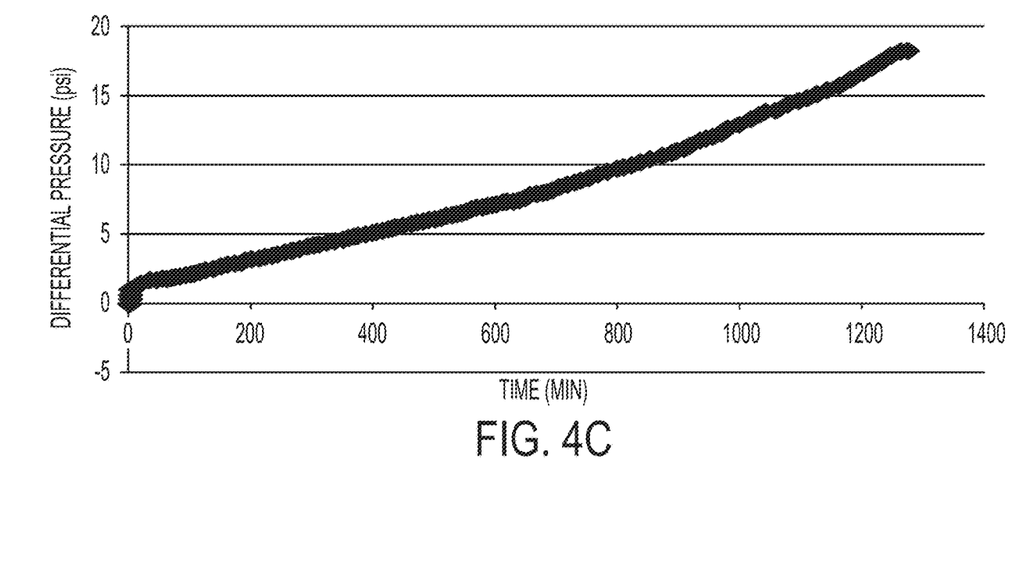

Following the preparation thereof, the aqueous 1 wt % NaI solution was injected into the prepared Berea sandstone core for about 130 minutes (min) at room temperature and a frontal advance rate of 0.5 ml/min. FIG. 4B is a graph showing differential pressure over the duration of the initial injection process. As can be seen in FIG. 4B, the differential pressure became fairly stable at about 2.7 psi after about 10 min. Thereafter, the aqueous 1 wt % NaI solution including the 1 wt % SNOWTEX®-AK cationic silica nanoparticles was injected into the Berea sandstone core for about 1300 min at room temperature and a frontal advance rate of 0.2 ml/min. FIG. 4C is a graph showing differential pressure over the duration of the secondary injection process. As can be seen in FIG. 4C, the differential pressure steadily increased over the duration of the secondary injection process indicating that the SNOWTEX®-AK cationic silica nanoparticles were successfully attaching to clay particles of the Berea sandstone core.

Figure 4D:
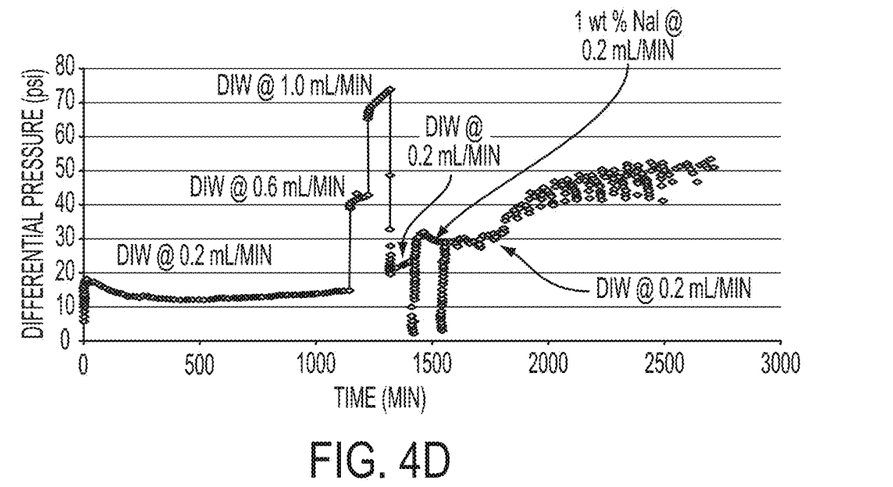
Figure 4E:
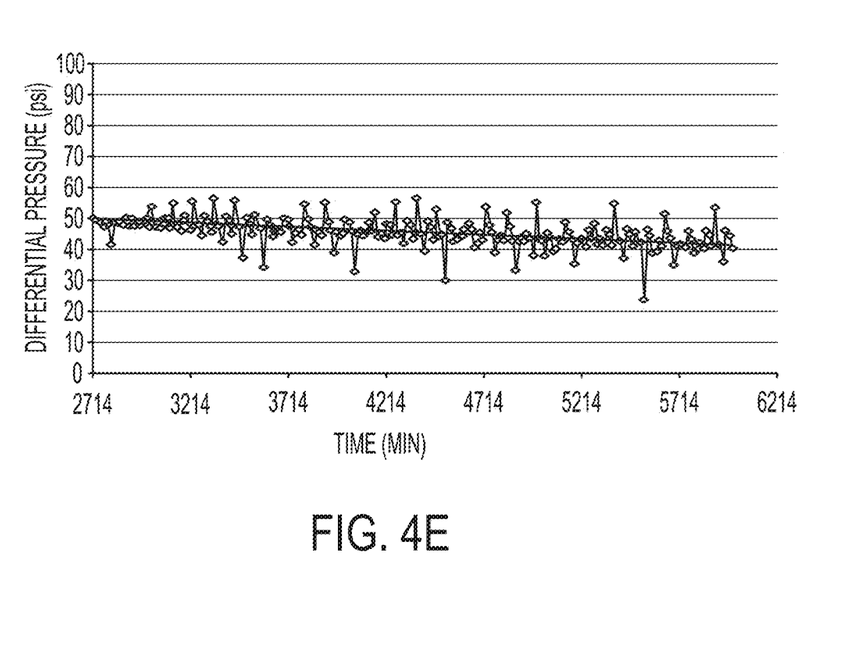

Following the treatment of the Berea sandstone core with the aqueous 1 wt % NaI solution including 1 wt % SNOWTEX®-AK cationic silica nanoparticles, the treated Berea sandstone core was subject to a series of deionized water (DIW) and aqueous 1 wt % NaI solution injections to evaluate the effectiveness of the SNOWTEX®-AK cationic silica nanoparticles at mitigating permeability losses. The treated Berea sandstone core was injected with deionized water for about 1200 min at room temperature and a frontal advance rate of 0.2 ml/min, followed by another injection of DIW for about 120 min at room temperature and a frontal advance rate of 0.6 ml/min, followed by another injection of DIW for about 120 min at room temperature and a frontal advance rate of 1.0 ml/min, followed by another injection of DIW for about 120 min at room temperature and a frontal advance rate of 0.2 ml/min, followed by an injection of aqueous 1 wt % NaI solution for about 120 min at room temperature and a frontal advance rate of 0.2 ml/min, followed by a final injection of DIW at room temperature and a frontal advance rate of 0.2 ml/min until cumulative total of 50 PV injection was completed. FIGS. 4D and 4E are graphs showing differential pressure over the duration of the series of additional injection processes. FIG. 4D shows the changes differential pressure changes through a portion of the final DIW injection, and FIG. 4E shows the changes differential pressure changes through the remainder of the final DIW injection until the completion of 50 PV total injection. As can be seen FIG. 4D, switching between DIW and aqueous 1 wt % NaI solution injections did not result did not result in an increase in differential pressure. In addition, as can be seen in FIG. 4E, the differential pressure did not increase over the duration of the final injection of DIW. The results indicate that treatment with the aqueous 1 wt % NaI solution including 1 wt % SNOWTEX®-AK cationic silica nanoparticles was successful at mitigating permeability losses for the Berea sandstone core.

Following the foregoing, the permeability of treated Berea sandstone core was measured and compared against the initial permeability Berea sandstone core. The treated Berea sandstone core exhibited about a 10 percent reduction in permeability as compared to the initial (e.g., untreated) Berea sandstone core. The 10 percent permeability reduction suggests clay particle swelling resulting from remaining positive charges of the clay particles (e.g., due to positively-charged surfaces of the clay particles remaining substantially unneutralized following treatment with the aqueous 1 wt % NaI solution including 1 wt % SNOWTEX®-AK cationic silica nanoparticles). Nonetheless, the SNOWTEX®-AK cationic silica nanoparticles were successful at substantially increasing the stability of the clay particles and mitigating permeability losses within the Berea sandstone core.

Example 4

A Berea sandstone core was subjected to core flooding experiments to evaluate permeability reduction (e.g., formation damage) control using anionic silica nanoparticles. The Berea sandstone core had a length of about 4 inches (in), a diameter of about 1.5 in, a weight within a range of from about 240 grams (g) to about 250 g, a pore volume of 19.32 milliliters (ml), a porosity within a range of from about 15 percent to about 20 percent, and an initial permeability within a range of from about 40 millidarcy (md) to about 50 md. The Berea sandstone core was prepared for experimentation by applying an overburden pressure of 1000 pounds per square inch (psi) using PENRECO® draked mineral oil, and vacuuming the Berea sandstone core at room temperature.

Figure 5A:
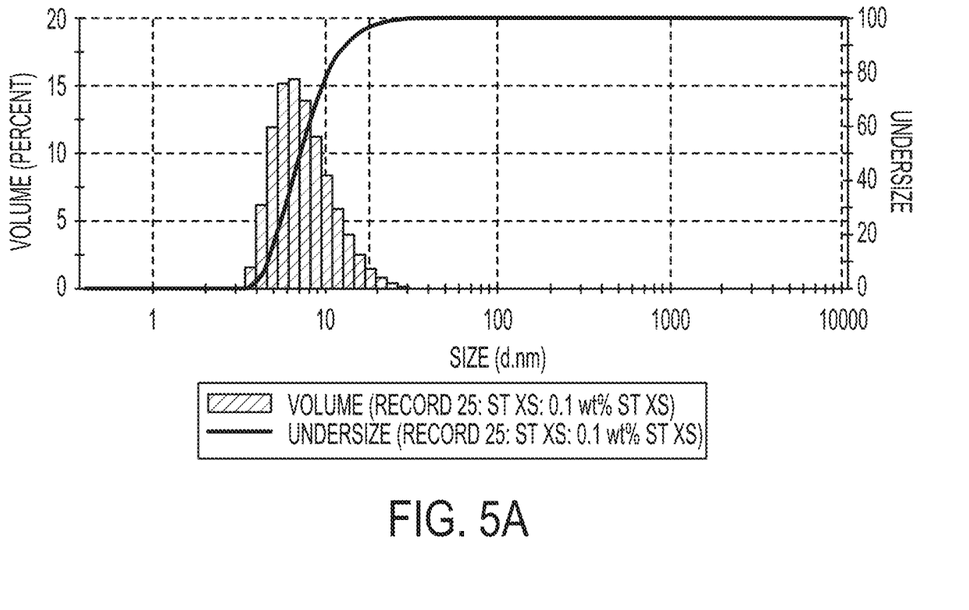
FIGS. 5A and 5B are graphical representations of the results described in Example 4.
Figure 5B:
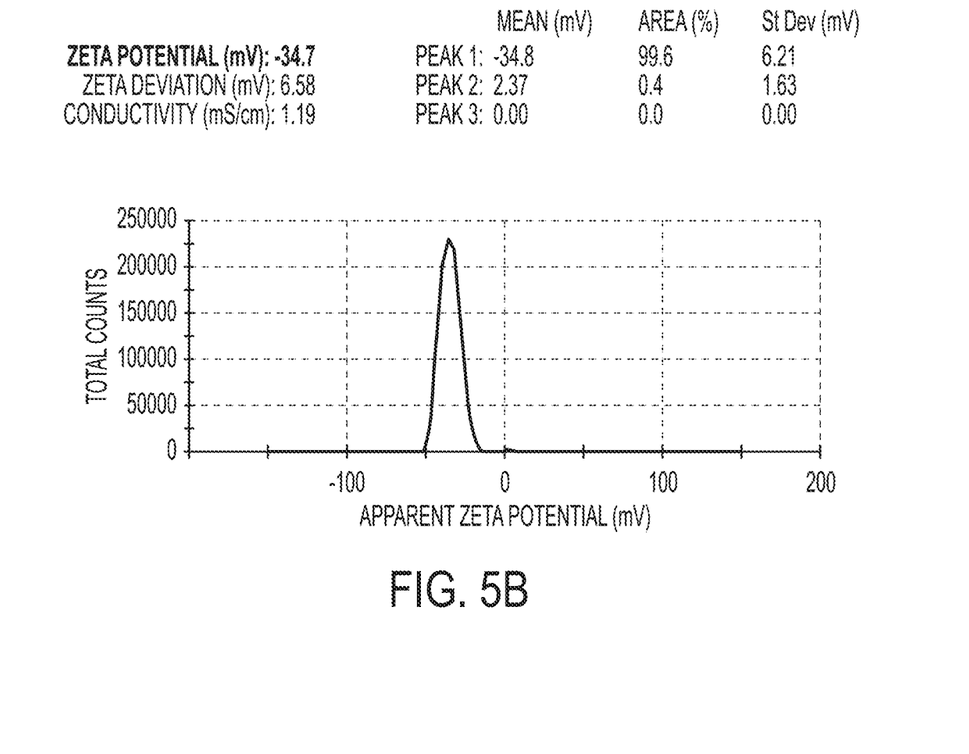

Following the preparation of the Berea sandstone core, an aqueous solution including 0.1 wt % SNOWTEX®-XS anionic silica nanoparticles in DIW was prepared. FIG. 5A is a graph showing the particle size distribution of the SNOWTEX®-XS anionic silica nanoparticles in the aqueous solution including 0.1 wt % SNOWTEX®-XS anionic silica nanoparticles in DIW. FIG. 5B is a graph showing the zeta potential of the SNOWTEX®-XS anionic silica nanoparticles which illustrates the stability of the dispersion.

After the preparation of the aqueous solution including the 0.1 wt % SNOWTEX®-XS anionic silica nanoparticles, DIW was injected into the Berea sandstone core for about 130 minutes (min) at room temperature and a frontal advance rate of 0.5 ml/min. Thereafter, the aqueous solution including 0.1 wt % SNOWTEX®-XS anionic silica nanoparticles in DIW was injected into the Berea sandstone core for about 1300 min at room temperature and a frontal advance rate of 0.2 ml/min.

Following the treatment of the Berea sandstone core with the aqueous solution including 0.1 wt % SNOWTEX®-XS anionic silica nanoparticles in DIW, the treated Berea sandstone core was injected with DIW to evaluate the effectiveness of the SNOWTEX®-XS anionic silica nanoparticle at mitigating permeability losses. No permeability reduction was observed up to 3 PV DIW injection. Thereafter, the differential pressure increased significantly and clay particle migration into the effluent stream was witnessed. The results show that treatment with the 0.1 wt % SNOWTEX®-XS anionic silica nanoparticles in DIW increased the stability of the clay particles and mitigated permeability losses within the Berea sandstone core, but indicate that combining anionic silica nanoparticles with cationic silica nanoparticles would substantially increase clay particle stabilization and reduce permeability losses as compared to treatment with anionic silica nanoparticles alone.

While the disclosure is susceptible to various modifications and alternative forms, specific embodiments have been shown by way of example in the drawings and have been described in detail herein. However, the disclosure is not intended to be limited to the particular forms disclosed. Rather, the disclosure is to cover all modifications, equivalents, and alternatives falling within the scope of the disclosure as defined by the following appended claims and their legal equivalents.

What is claimed is:
1. A treatment fluid for a subterranean formation, comprising:
   an aqueous, alkaline solution comprising water and one or more of NaI, KOH, LiOH, $Na_2CO_3$, $K_2CO_3$, $Li_2CO_3$, and $CH_5N$;
   anionic silica nanoparticles dispersed within the aqueous, alkaline solution, the anionic silica nanoparticles comprising one or more anionic functional groups selected from the group consisting of aldehyde groups, epoxy groups, halogen groups, hydroxyl groups, nitrile groups, phosphate groups, phosphonate groups, silanol groups, silanediol groups, silanetriol groups, sulfate groups, and thiol groups; and
   cationic silica nanoparticles dispersed within the aqueous, alkaline solution, the cationic silica nanoparticles comprising one or more cationic functional groups selected from the group consisting of pyridinium groups, ammonium groups, quaternary ammonium groups, imidazolium groups, quaternary phosphonium groups, and tertiary sulfonium groups;
   wherein an amount of the anionic silica nanoparticles is less than an amount of the cationic silica nanoparticles.
2. The treatment fluid of claim 1, wherein the anionic silica nanoparticles each individually have a diameter within a range of from about 5 nm to about 80 nm.
3. The treatment fluid of claim 1, wherein the cationic silica nanoparticles each individually have a diameter within a range of from about 20 nm to about 100 nm.
4. The treatment fluid of claim 1, wherein the aqueous, alkaline solution comprises one or more of LiOH, $Na_2CO_3$, $K_2CO_3$, $Li_2CO_3$, and $CH_5N$.
5. The treatment fluid of claim 1, wherein the treatment fluid comprises from about 0.01 wt % to about 1.0 wt % of the anionic silica nanoparticles, and from about 0.01 wt % to about 1.0 wt % of the cationic silica nanoparticles.

6. The treatment fluid of claim 1, wherein:
- each of the anionic silica nanoparticles consists of silica having one or more types of anionic functional groups attached to atoms thereof; and
- each of the cationic silica nanoparticles consists of silica having one or more types of cationic functional groups attached to atoms thereof.

7. A treatment fluid for a subterranean formation, consisting of:
- anionic particles each exhibiting a width less than 1 μm and consisting essentially of:
  - a silica particle; and
  - anionic functional groups attached to surface atoms of the silica particle, the anionic functional groups selected from the group consisting of terminal hydroxyl groups and terminal carboxyl groups;
- cationic particles each exhibiting a width less than 1 μm and consisting essentially of:
  - an additional silica particle; and
  - terminal quaternary ammonium groups attached to surface atoms of the additional silica particle; and
- an aqueous alkaline solution consisting of water and one or more of NaI, KOH, LiOH, $Na_2CO_3$, $K_2CO_3$, $Li_2CO_3$, and $CH_5N$.

8. The treatment fluid of claim 7, wherein each of the anionic particles exhibits from one of the anionic functional groups per five of the surface atoms of the silica particle to one of the anionic functional groups per one hundred of the surface atoms of the silica particle.

9. The treatment fluid of claim 7, wherein each of the cationic particles exhibits from one of the cationic functional groups per five of the surface atoms of the additional silica particle to one of the cationic functional groups per one hundred of the surface atoms of the additional silica particle.

10. The treatment fluid of claim 7, wherein the aqueous alkaline solution comprises an aqueous 1.0 wt % NaI solution.

11. A treatment fluid for a subterranean formation, consisting essentially of:
- a homogeneous mixture consisting essentially of:
  - from about 0.01 wt % to about 1.0 wt % anionic silica particles, the anionic silica particles each consisting of silica and anionic functional groups attached to the silica;
  - from about 0.01 wt % to about 1.0 wt % cationic silica particles, the cationic silica particles each consisting of additional silica and cationic functional groups attached to the additional silica;
  - wherein an amount of the anionic silica particles is less than an amount of the cationic silica particles;
  - an aqueous, 1 wt % NaI solution; and
  - one or more of a dispersant, a scale inhibitor, a scale dissolver, and a defoamer.

12. The treatment fluid of claim 11, wherein the anionic silica particles and the cationic silica particles each individually exhibit a diameter less than or equal to about 100 nm.

\* \* \* \* \*

UNITED STATES PATENT AND TRADEMARK OFFICE
CERTIFICATE OF CORRECTION

PATENT NO. : 10,907,089 B2
APPLICATION NO. : 15/905622
DATED : February 2, 2021
INVENTOR(S) : Devesh Kumar Agrawal et al.

Page 1 of 1

It is certified that error appears in the above-identified patent and that said Letters Patent is hereby corrected as shown below:

In the Specification
Column 14, Line 22, change "draked oil" to --draked mineral oil--

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*